United States Patent

Yoshigai

[11] 4,051,924
[45] Oct. 4, 1977

[54] DEVICE FOR MOUNTING BRAKE SHOE OF BRAKE FOR BICYCLE

[75] Inventor: Kiyokazu Yoshigai, Higashi-Osaka, Japan

[73] Assignee: Yoshigai Kikai Kinzoku Kabushiki Kaisha, Osaka, Japan

[21] Appl. No.: 719,739

[22] Filed: Sept. 2, 1976

[30] Foreign Application Priority Data

Oct. 15, 1975 Japan .................... 50-141571[U]

[51] Int. Cl.$^2$ .................................... B62L 1/12
[52] U.S. Cl. .................... 188/24; 188/220.6; 188/234; 403/123; 403/131
[58] Field of Search .................... 188/24, 72.6, 72.9, 188/220.6, 234; 403/122, 123, 131

[56] References Cited

U.S. PATENT DOCUMENTS

| 3,172,340 | 3/1965 | Blenkle | 403/122 X |
| 3,548,974 | 12/1970 | Klaue | 188/72.6 |
| 3,809,187 | 5/1974 | Grieve | 188/24 |

FOREIGN PATENT DOCUMENTS

| 579,602 | 8/1924 | France | 188/24 |
| 76,617 | 10/1961 | France | 188/24 |
| 23,882 | 8/1903 | United Kingdom | 188/24 |

*Primary Examiner*—George E. A. Halvosa
*Attorney, Agent, or Firm*—Spensley, Horn and Lubitz

[57] ABSTRACT

In a brake for bicycles including brake shoes having brake blocks and secured by a threaded fastening member to brake arches so that the brake blocks are engageable with and disengageable from the rim of a wheel, a device for adjustably or shiftably supporting the brake shoe on the brake arch. A convex portion and a concave seat for receiving the convex portion are provided between the brake shoe and the brake arch, such that when the fastening member securing the brake shoe to the brake arch is loosened, the brake shoe is shiftable to position the brake block properly with respect to the wheel rim by virtue of cooperation of the convex portion and the concave seat. After the brake shoe has been adjusted to place, the fastening member is tightened up, whereby the brake shoe is fastened to the brake arch, with the concave portion and the seat fitted together face-to-face.

2 Claims, 10 Drawing Figures

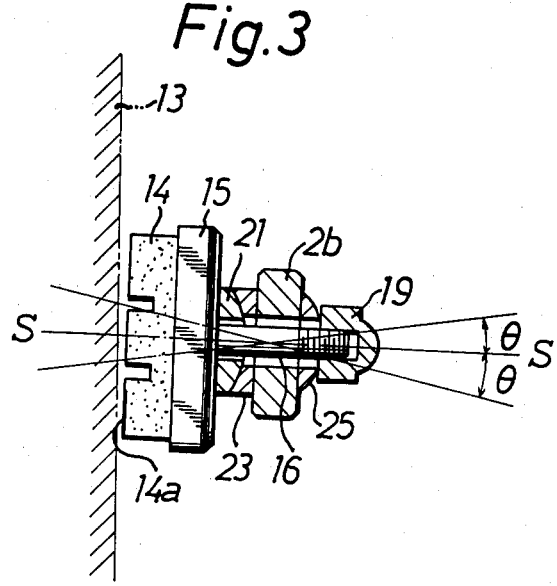
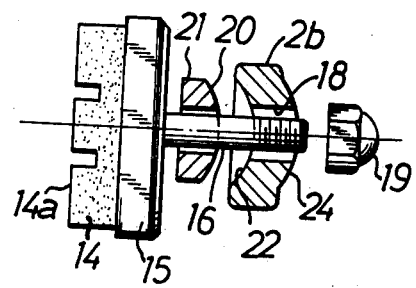
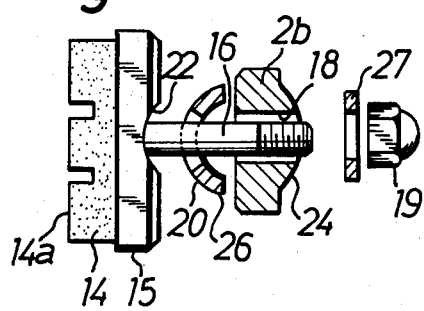

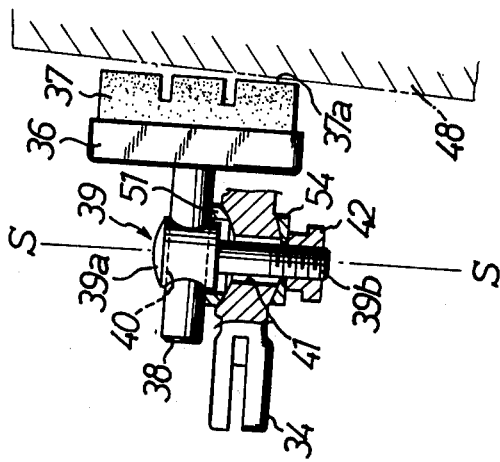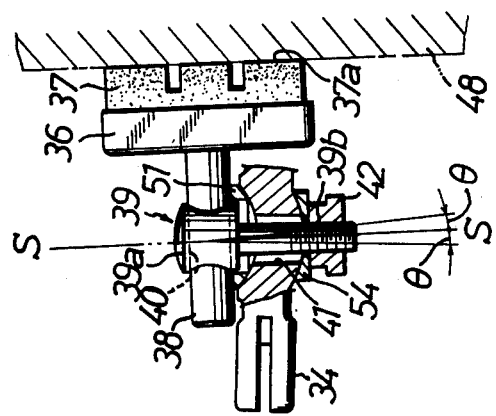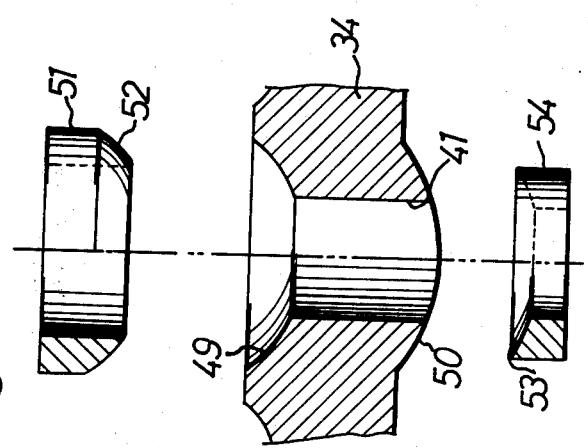

DEVICE FOR MOUNTING BRAKE SHOE OF BRAKE FOR BICYCLE

BACKGROUND OF THE INVENTION

This invention relates to brakes for bicycles, and more particularly to a device by which a brake shoe having a brake block engageable with and disengageable from the rim of a wheel is supported on a brake arch by threaded fastening means.

With side-pull or center-pull caliper brakes for bicycles, each brake shoe is usually mounted in place by inserting a shoe stem integral with the shoe into a support bore in a brake arch and fastening a nut to the projecting end to the shoe stem.

Further with cantilever brakes, it is generally practiced to braze a base to a specified portion such as the front fork blade of the bicycle, pivotably mount a brake arch on the base in a cantilever fashion, fasten an eyebolt to the arch by a threaded member and insert the brake shoe stem into the eyebolt. In the case of the cantilever type, the base is frequently brazed to its support as deviated from the desired position, with the result that when the cantilever brake is mounted on the base, the brake shoe will not be properly positioned with respect to the rim surface, or difficulty will be experienced in effecting a brake action by causing the brake block to contact the rim surface progressively from its front end in the direction of advance of the rim.

Further with side-pull or center-pull brakes, it is extremely difficult to position the brake block at an accurate angle with the wheel rim surface, so that reduced braking efficiency is encountered. If the brake block is so positioned that the entire surface of the block will come into sliding contact with the rim surface, the brake operates suddenly with high impact, posing safety problems.

Thus with the conventional brakes for bicycles, the pair of brake blocks is mounted on the opposite sides of the wheel rim surface for engagement with and disengagement from the rim surface, in such manner that the brake shoe, crimped to hold each of the brake blocks is fastened to the brake arch by screw means and is not shiftable for the adjustment of its position. Consequently it is difficult to permit the brake blocks to intimately contact the rim surface with accuracy.

SUMMARY OF THE INVENTION

An object of this invention is to provide a device for use in existing brakes for bicycles to support a brake shoe on a brake arch by threaded fastening means, such that the brake shoe is shiftable relative to the brake arch, permitting the brake block to oppose the wheel rim surface at a proper angle or in an adjusted proper position relative to the surface.

Another object of this invention is to provide a device including universal spherical surface assemblies by which the brake block is adjustable, with extreme ease and accuracy, to a proper position relative to the wheel rim surface.

Another object of this invention is to provide a device including universal spherical surface assemblies by which the brake block can be always adjusted to a proper position relative to the wheel rim surface in whatever improper position the block opposes the rim surface.

Another object of this invention is to provide a device including universal spherical surface assemblies in which spherical surfaces are held in contact with each other after the brake shoe has been secured to the brake arch by threaded fastening means, without permitting loosening of the fastening means.

Still another object of this invention is to provide a device which is simple in construction and easily and properly adjustable by any person and which can be incorporated into existing brakes without the necessity of substantially changing the construction and design.

These objects can be achieved by the improvement, constituent parts and combination thereof provided by the invention, specific embodiments of which will be described below in detail with reference to the accompanying drawings. It is to be understood that modifications or alterations relating to the construction are included within the scope of the appended claims.

BRIEF DESCRIPTION OF THE DRAWINGS

FIG. 3 is an enlarged plan view in cross section showing the brake shoe mounting device as it is mounted in place, the view also illustrating the mode of adjusting the brake block relative to the wheel rim;

FIG. 4 is a front view in vertical section showing another embodiment of this invention in disassembled state, the embodiment including a brake arch of modified construction;

FIG. 5 is a front view in vertical section showing another embodiment of the invention in diassembled state, the embodiment including a brake shoe of modified construction;

FIG. 8 is a plan view partly broken away to show the principal part on one side of FIG. 7;

FIG. 9 is a plan view partly broken away to show the brake in braking operation after it has been adjusted; and FIG. 10 is an exploded sectional view on an enlarged scale showing the principal members of the embodiment.

DESCRIPTION OF THE PREFERRED EMBODIMENTS

Figure 1:
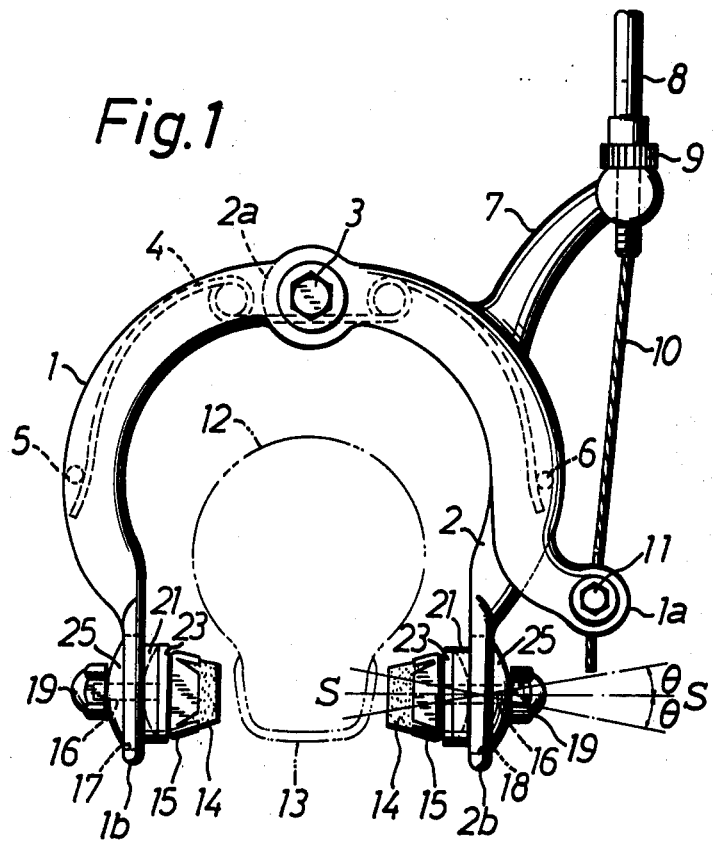
FIG. 1 is a front view showing a side-pull caliper brake incorporating a brake shoe mounting device of this invention.
Figure 2:
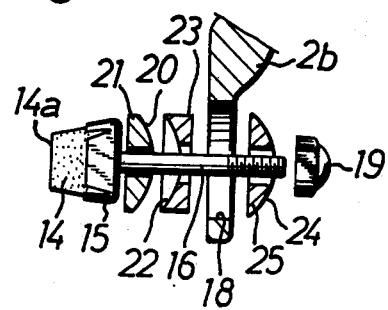
FIG. 2 is a front view in vertical section showing the device in disassembled state.

FIGS. 1 and 2 show a device of this invention incorporated in a side-pull caliper brake. The brake includes a first brake arch 1 resembling a horseshoe and a second brake arch 2 substantially resembling one-half of a horseshoe and fitted to the rear surface of the first brake arch 1. The arch 2 has an upper end 2a pivotably connected by a pin 3 to an approximate midportion of the first brake arch 1.

A spring 4 resembling spectacles extends at its midportion through the pin 3 transversely thereof and has opposite free ends engaging projections 5 and 6 provided on the rear surfaces of the first and second arches 1 and 2 at their intermediate portions. The first and second arches 1 and 2, supported by the pin 3, are urged away from each other at all times by the action of the spring 4.

The second brake arch 2 has an arm 7 extending from an intermediate portion thereof. The arm 7 has a free end provided with a connector 9 fixedly supporting one end of an outer wire 8. An inner wire 10 for operating the brake extends through the connector 9 and has one end connected to one end 1a of the first brake arch 1 by a connector 11. A wheel 12 of the bicycle has a rim 13. A pair of brake blocks 14 are opposed to the opposite sides of the rim 13 respectively. Each brake block 14 is engageable with and disengageable from the side wall of the rim 13.

The pair of brake blockes 14 are mounted on the first brake arch 1 and the second brake arch 2 respectively. Each of the brake blocks 14 is made of abrasion resistant rubber or the like and is gripped by a crimped brake shoe 15. The brake shoe is integral with a stem 16. The stem 16 of one brake shoe 15 extends through a vertical support bore 17 formed in the other end 1b of the first brake arch 1. The stem 16 of the other brake shoe 15 extends through a vertical support bore 18 formed in the other end 2b of the second brake arch 2. Nuts 19 are screwed on the threaded portions of the shoe stems 16 to secure the shoes 15 in position.

When the brake shoes 15 are fastened to the first and second arches 1 and 2 by threaded fastening means, the brake blocks 14 are positioned on the opposite sides of the rim 13 and are opposed to each other.

According to the present invention, there are provided, on the shoe stem 16 between the brake shoe 15 and each of the arch ends 1b and 2b, a washer 21 having a convex portion 20 on one side and a flat surface on the other side in contact with the shoe 15, and a washer 23 having on one side a spherical concave seat 22 complimentary to and fittable face-to-face to the convex portion 20 for receiving the portion 20, the washer 23 having a flat surface on the other side in contact with each of the arch ends 1b and 2b. Further interposed between the nut 19 and each of the arch ends 1b and 2b is a washer 25 having a convex portion 24 on one side in contact with the nut 19 and a flat surface on the other side in contact with the outer side of the arch end.

Each of the brake shoes 15 is mounted in place in the manner to be described below with reference to FIGS. 2 and 3. The first washer 21 is first placed on the shoe stem 16 of the brake shoe 15 holding the brake block 14, with the convex portion 20 facing outward. The second washer 23 is then placed on the brake shoe stem 16, with the concave seat 22 opposed face-to-face to the convex portion 20 of the first washer 21. The shoe stem 16 is then passed through the vertical bore 18 formed in the arch end. Subsequently the third washer 25 is placed on the brake shoe 16 with its convex portion 24 facing outward. The cap nut 19 is then screwed onto the threaded portion of the shoe stem 16 to fasten the brake shoe 15 to the brake arch 2. If the braking surface 14a of the brake block 14 is not opposed to the rim 13 at a specified angle as seen in FIG. 3 when the brake shoe 15 is thus fastened in place, the nut 19 is temporarily loosened and the inclination of the axis S—S of the brake shoe stem 16 with respect to the axis of the support bore 18 is vertically or laterally adjusted by an angle $\theta$ as desired to thereby position the braking surface 14a at the desired angle with the rim 13. Thus the convex portion 20 of the first washer 21 and the concave seat 22 of the second washer 23 coact with each other to serve as a universal spherical surface assembly by which the brake shoe 15 is rendered shiftable. After the brake shoe 15 has been positioned at a proper angle, the nut 19 is tightly fastened. At this time, even when the direction of the brake shoe stem 16 has been shifted within the support bore 18, the nut 19 can be screwed on the stem, since the third washer 25 has the convex portion 24 which serves to seat the nut 19.

After the nut 19 has been fastened, the first and second washer 21 and 23 are clamped between the rear surface of the brake shoe 15 and the brake arch 2.

According to another preferred embodiment shown in FIG. 4, the ends 1b and 2b of the brake arches 1 and 2 are each directly formed with a concave seat surface 22 for receiving the convex portion 20 of the first washer 21. Similarly the ends 1b and 2b are bulged to directly provide a convex portion 24 on the outer side thereof for seating the nut 19. Basically this embodiment has the same construction as the foregoing embodiment, and the brake shoe 15 can be positioned at a proper angle with the rim in the same manner as above. The embodiment shown in FIG. 4 has the advantage that the second and third washers 23 and 25 can be eliminated simply by slightly modifying part of the brake arches 1 and 2 to reduce the number of the constituent parts and the number of assembling steps.

Another preferred embodiment shown in FIG. 5 includes a concave seat 22 formed directly formed in the rear wall of the brake shoe 15 and a bowl-like washer 26 having a convex portion 20 fitted to the seat 22. The end of the brake arch has on its outer side a convex portion 24 for seating the nut 19 thereon. The cap nut 19 is screwed on the threaded portion of the shoe stem 16, with a spring washer 27 interposed between the portion 24 and the nut 19, to mount the brake shoe 15 on each of the brake arch 1 and 2. With the embodiment of FIG. 5, the axis of the shoe stem 15 can also be inclined upward or downward or laterally within each of the support bores 17 and 18 with respect to the axis of the bore, when the nut 19 is loosened, whereby the braking surface 14a of the brake block 14 can be properly positioned relative to the rim 13.

Figure 6:
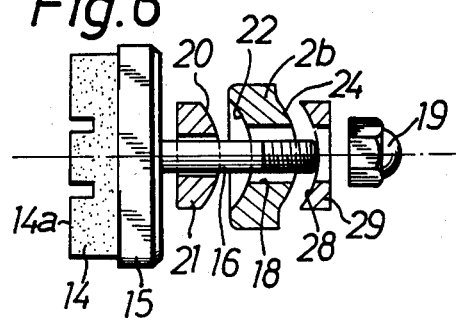
FIG. 6 is a front view in vertical section showing another embodiment of this invention in disassembled state, the embodiment including a washer provided between the brake arch and the nut in the embodiment of FIG. 4.

The most referred embodiment shown in FIG. 6 comprises the construction shown in FIG. 4 and further includes a washer 29 having a concave seat 28 on one side and a flat surface on the other side. The seat 28 opposes and fits to the convex portion 24, and the nut 19 is screwed on the threaded portion of the shoe stem 16. The shoe stem 16 can be inclined with respect to the axis of the support bore 17 (or 18) within the bore. The embodiment of FIG. 6 is advantageous in that the nut 19 is more effectively seatable in place when fastened.

This invention has been described above with reference to FIGS. 1 to 6 showing several embodiments in which the invention is applied to a side-pull caliper brake for bicycles. Similarly the invention is also applicable to brakes of the center-pull type. FIGS. 7 to 10 further show the invention as it is embodied in a brake of the cantilever type.

Figure 7:
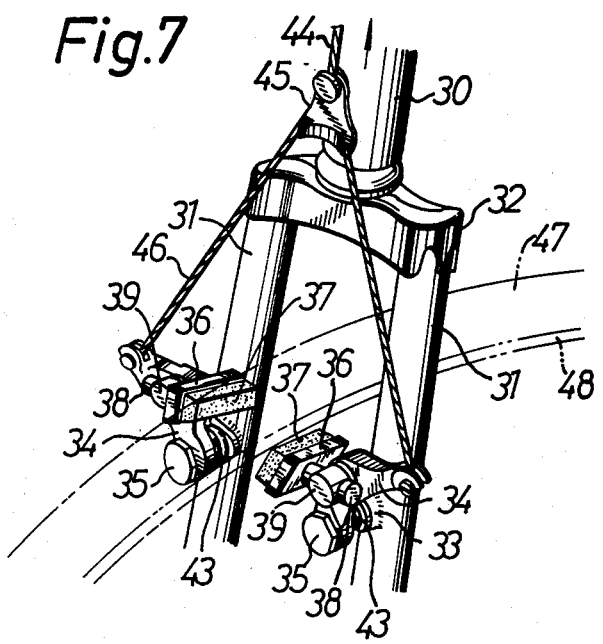
FIG. 7 is an overall perspective view of another embodiment of this invention incorporated in a brake of the cantilever type mounted on the front fork of a bicycle.

FIG. 7 shows an overall view of a cantilever brake including a front fork stem 30, a pair of fork blades 31 extending from a fork crown 32 on the stem 30, a base 33 brazed to the front surface of each of the fork blades 31 and a cantilever brake arch 34 having a base end pivoted to each of the bases 33 by a bolt 35.

A brake shoe 36 holds a brake block 37 by being crimped and has on its rear side a brake shoe stem 38 integral therewith. An eyebolt 39 for supporting the brake shoe 36 has a bore 40 extending through its head 39a and receiving the shoe stem 38 therein as illustrated in FIGS. 8 and 9.

The threaded portion 39b of the eyebolt 39 extends through a support bore 41 formed in the brake arch 34. A nut 42 is screwed on the projecting end of the threaded portion 39b. Thus the shoe stem 38 intersecting the eyebolt 39 at right angles is secured to the brake arch 34 by the screw-thread fastening means. An arch returning spring 43 is wound around the bolt 35 between the arch 34 and the base 33. A brake operating cable 44 has one end connected to a hanger 45. A wire 46 interconnecting the free ends of the pair of arches 34 is suspended at its midportion from the hanger 45.

Indicated at 47 is a wheel of the bicycle and at 48 the rim of the wheel. Opposed to the opposite sides of the rim 48 are braking surfaces 37a of the braking blocks 37. The cable 44, when manually pulled in the direction of the arrow in FIG. 7, pivotally moves the pair of the brake arches 34 about the bolts 35, bringing the braking surfaces 37a of the brake blocks 37 into contact with the rim 48 to brake the wheel 47. When the cable 44 is released, the springs 43 force the brake blocks 37 away from the rim 48.

If the base 33 is brazed to the front of the fork blade 31 as displaced from the specified position, the brake block 37 will not be positioned properly with respect to the rim 48, since the brake shoe 36 is adapted to pivotably move about the base 33. The support assembly for the brake shoe 36 incorporates adjusting means by which the brake block 37 is properly positionable with respect to the rim 48 even when the base 33 is not positioned as specified.

For this purpose, the support bore 41 is designed to have an inside diameter which is greater than the outside diameter of the threaded portion 39b of the eyebolt 39 so as to provide a sufficient clearance between the peripheral surface of the threaded portion 39b and the inside surface defining the support bore 41. The threaded portion 39b therefore loosely extends through the support bore 41 and is positioned in the direction of advance of the bicycle. As seen in FIG. 10, the arch 34 is formed on its front side with a concave set 49 and bulged on its rear side to provide a convex portion 50.

An annular washer 51 adapted to fit around the head 39a of the eyebolt 39 has on one side thereof a convex portion 52 in conformity with the concave seat 49 as seen in FIG. 10 and a flat surface on the other side thereof. The washer 51 is provided between the shoe stem 38 and the arch 34 as illustrated in FIG. 8.

With reference to FIG. 10, a washer 54 has a concave seat 53 in conformity with the convex portion 50 of the arch 34 on one side and a flat surface on the other side for seating the nut thereon. The washer 54 is incorporated in place as shown in FIG. 8, and the nut 42 is screwed on the threaded portion 39b.

According to the embodiment shown in FIGS. 7 to 10, the eyebolt 39 is passed through the support bore 41 in the arch 34 coaxially therewith and the nut 42 is tightly fastened when the base 33 is accurately positioned on the fork blade 31, whereby the brake shoe stem 38 can be positioned at right angles to the axis S—S of the support bore 41 as seen in FIG. 8.

However, if the base 33 is not brazed to the fork blade 31 in accurate position, the brake shoe 36 will not be properly positioned with respect to the rim 48, when the brake shoe stem 38 is disposed exactly at right angles to the axis S—S of the support bore 41 in the arch 34. Accordingly the nut 42 is temporarily loosened in this case. The eyebolt 39 can then be laterally inclined within the bore 41 by an angle $\theta$ with respect to the axis S—S of the bore, since the inside diameter of the bore is greater than the outside diameter of the threaded portion of the eyebolt 39. Thus by adjusting the inclination of the eyebolt 39, the block 37 on the brake shoe 36 is properly positionable as desired with respect to the rim 48. After the adjustment, the nut 42 is tightly fastened, whereupon the convex portion 52 of the washer 51 fits face-to-face to the concave seat 49 in the arch 34, and the convex portion 50 on the arch 34 similarly fits to the convex seat 53 in the washer 54. Consequently uniform contact is achieved between the mating spherical surfaces as in the case of FIG. 8, permitting the brake shoe stem 38 to be tightly secured in place against loosening even when subjected to shakes.

Although the arch 34 is formed with the concave seat 49 on the front side of the bore 41 and with the convex portion 50 on the rear side thereof in the embodiment shown in FIGS. 7 to 10, the arch may conversely be formed with a convex portion on its front side and a concave seat on it rear side. Alternatively both the front and rear partially spherical portions may have a convex or concave shape. In this case, however, one side of each of the washers 51 and 54 needs to have a spherical shape in conformity with the mating portion of the arch.

The invention described above is advantageously applicable to brakes in which the brake shoe stem passed through a support bore in the brake arch is fastened by a nut and also to brakes in which an eyebolt passed through the arch is fastened by a nut to mount the brake shoe on the arch. When the brake block on the brake shoe of such brakes is not positioned properly with respect to the rim, the brake block is adjustable to the proper position by virtue of the cooperation between the concave seat and the convex portion after the nut has been loosened and the nut is subsequently tightened. The brake shoe can therefore be fastened to position by the nut which is stably seated in place. Thus the invention enables the brake block to be always positioned properly relative to the rim surface by very simple means incorporated in the brake, ensuring an effective braking action without permitting the loosening of the fastened nut even when it is subjected to shakes.

What is claimed is:

1. In a caliper brake for a bicycle including a pair of brake shoes disposed on the opposite sides of the rim of a wheel and engageable with a disengageable from the rim, a pair of brake arches each having a support bore for receiving a shoe stem of each of the brake shoes extending therethrough and nuts each screwed on the projecting end of each of the shoe stems extending through the support bore, a device for mounting the brake shoe comprising universal spherical surface assemblies coupling the brake shoe to the brake arch, each of the assemblies comprises a first washer having a convex portion and a second washer having a concave seat and a third washer provided between the nut and the brake arch, the third washer having a convex portion for seating the nut thereon, the convex portion of the first washer and the concave seat of the second washer being cooperative to freely adjust the position of the brake shoe when the nut is loosened and the brake shoe stem is inclined within the support bore thereof, so that the nut is tightly fastened with a brake block on the brake shoe properly opposed to the rim.

2. In a caliper brake for a bicycle including a pair of brake shoes disposed on the opposite sides of the rim of a wheel and engageable with and disengageable from the rim, a pair of brake arches each having a support bore for receiving a shoe stem of each of the brake shoes extending therethrough and nuts each screwed on the projecting end of each of the shoe stems extending through the support bore, a device for mounting the brake shoe comprising universal spherical surface assemblies coupling the brake shoe to the brake arch, said assemblies comprising a first washer interposed between the brake shoe and the brake arch and having on one side thereof a convex portion complementary to a concave seat formed in the brake arch, the first washer further having on the other side thereof a flat surface in contact with the rear surface of the brake shoe, a second washer having on one side thereof a concave seat for receiving a convex portion formed on the brake arch on the opposite side of the brake arch from the concave seat, the second washer further having on the other side thereof a flat seat surface for the nut, the convex portions of the first washer and the brake arch and the concave seats of the brake arch and the second washer being cooperative to freely adjust the position of the brake shoe when the nut is loosened and the brake shoe stem is inclined within the support bore therefor such that the nut is fastened to the shoe stem with a brake block on the brake shoe properly opposed to the rim whereby a compact device for mounting said brake shoe having a shortened shoe stem is formed.

* * * * *